Figure 1:
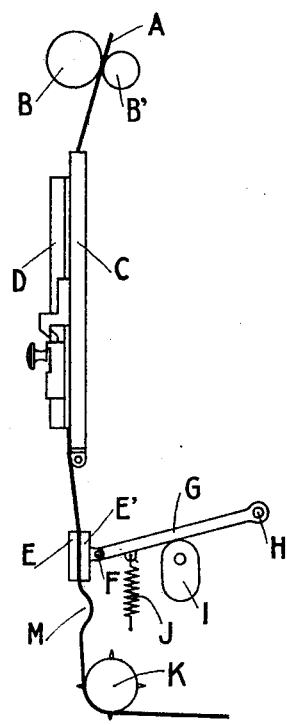

April 2, 1929. J. S. POCOVÍ 1,707,943
CINEMATOGRAPHIC APPARATUS
Filed Aug. 24, 1922   2 Sheets-Sheet 1

Inventor
J. Sastre Pocoví
by
W. E. Evans
Attorney.

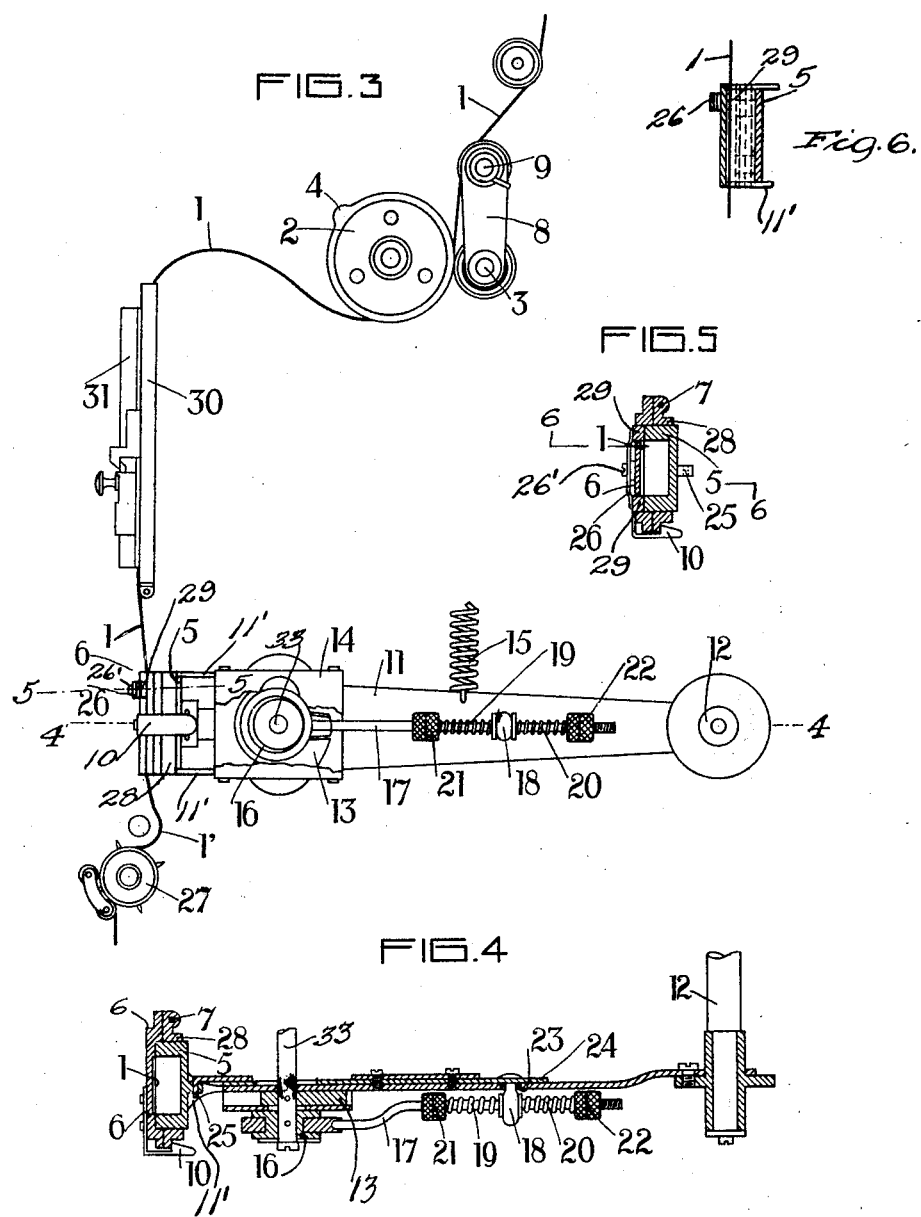

Patented Apr. 2, 1929.

1,707,943

UNITED STATES PATENT OFFICE.

JUAN SASTRE POCOVÍ, OF BARCELONA, SPAIN.

CINEMATOGRAPHIC APPARATUS.

Application filed August 24, 1922, Serial No. 584,072, and in Spain June 19, 1922.

The intermittent advance of films in cinematographic apparatus as hitherto known and generally employed is obtained by the engagement of toothed sprockets with the perforations, which are provided for this purpose near the edges of the films, and as these perforations vary in their spacing or in their size, according to the make of film, the teeth of the sprockets which engage the perforations are made conical so as to be adaptable to all films, but it will be understood that the length of film drawn forward at each movement is dependent upon such variations and varies with them, and that it must correspond to the height of the images on the films.

The necessity for the intermittent feed member to be adaptable to all spacings of the perforations or to all the different heights of images of the films has rendered it impossible up to the present to replace the toothed sprocket as the intermittent feed member; and as the employment of this type of feed member has the disadvantage of producing rapid deterioration of the films by reason of the excessive tension exerted by the teeth on the perforations, the solution of the problem of replacement is of great importance.

The invention has for its object to remove the disadvantage attendant upon the use of toothed sprockets for the purpose described.

The means provided according to the invention comprise a mechanical arrangement for producing an intermittent feed by periodically gripping and carrying forward the film over a constant distance greater than the distance between centres of successive images on the film, and, in conjunction therewith, toothed sprockets such as before referred to, that is to say, similar to those hitherto employed for producing the feed movement of films by engagement with the perforations in the edges of the films. The sprockets provided in the mechanism according to the present invention, however, are not utilized to effect the actual feed of the film, but serve intermittently to withdraw or lead away the film at each feed movement a distance corresponding to the distance between centres of successive images on the film.

As the intermittent feed member hereinbefore described, feeds on the first stroke, a greater length of film than is withdrawn by the toothed sprockets, there remains an excess length of film forming a loop or fold, and in subsequent feed movements this loop or fold is alternately disposed between the projection window and the intermittent feed member, and between the latter and the toothed sprockets withdrawing the film, so that the loop or fold in the film is always included in the length of film carried forward. By such means the film is, in each case, actually advanced only after the loop or fold between the projection window and the intermittent feed member has disappeared, that is to say, after the film has been extended; and as the size of this loop or fold corresponds to the difference between the length of film carried forward by the intermittent feed member and the length of film withdrawn by the toothed sprockets, it follows that the latter determine the length of film advanced at each feed movement, notwithstanding that they are not themselves the means by which the feed is effected, so that while adaptable to films, whatever the spacing of their perforations, as in apparatus known and in use, there is avoided the severe stress applied to the films when the feed is effected by the engagement of sprocket teeth with the lateral perforations in the film.

Figure 2:
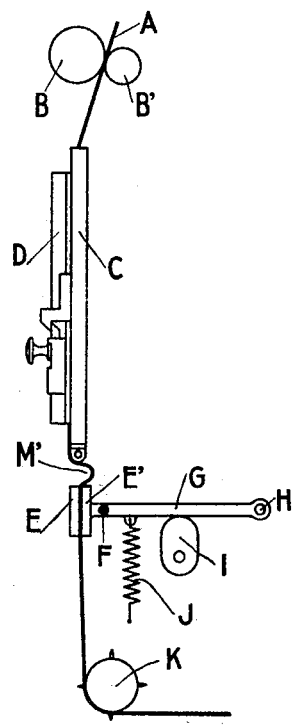

In Figures 1 and 2 of the accompanying diagrammatic drawings, is illustrated the operation of the feed mechanism hereinbefore described.

In Figures 1 and 2, the film A is represented as passing from between the two rollers B, B' to the projection window C and its gate D, as usual in cinematographic apparatus. E, E' represent two members for engaging the film and which, by means of a suitable arrangement, can be caused to approach or separate one from the other in order to engage or release the film. These gripping members are carried at F at the extremity of a lever G pivoted at H and which is raised and lowered by means of a cam I and of a counter-acting spring J. The arrangement of these parts is such that when the lever G descends, the members E, E' grip the film, and when the said lever G rises, the members E, E' are slightly separated or released the one from the other in order that the film may be subjected only to slight friction between them. At K toothed sprockets are provided similar to those which are employed in usual cinematographic apparatus, the toothed sprockets being operated by a Maltese cross device.

When the lever G descends (Figure 1), the members E, E' grip and carry the film downwardly a distance in excess of the distance between centres of successive images on the film, whereby a loop or fold is formed in the film at M, while the the toothed sprockets K, which engage with the perforations of the film, withdraw it or conduct it away to an extent corresponding to the distance between centres of successive images on the film, but without exercising appreciable tension upon it. With the parts in this disposition, the lever G now effects its upward movement and the gripping members E, E', which now only engage lightly with the film, draw it upward and cause the loop or fold M to be drawn out, whereby a second loop or fold is formed at M' (Figure 2) between the gripping members E, E' and the projection window and gate C, D. The pressure exerted upon the film in the upward movement of the members E, E' is sufficient to allow the loop to be transferred from below the members E, E' to the desired point above, but insufficient to prevent the passage of the film past the members E, E' in the upward movement of the latter, after the portion of film below them has been drawn taut. When the lever G again descends and when, as a consequence, the gripping members E, E' tightly engage the film, the latter is fed forward afresh past the projection window and gate only when the loop or fold M' has been absorbed, and thus the extent of the feed will be less than the stroke of the members E, E' by the length of film forming the loop or fold M'; and as this latter is the difference between the stroke of the members E, E' and the length of the film taken up by the toothed sprockets K, it follows that the length of film fed forward past the projection window at each intermittent feed movement of the gripping members E, E' is equal to the length of the film which is withdrawn during each of the intermittent feed movements by the toothed sprockets K.

Thus, whatever the disposition and spacing of the perforations of the film, it is fed through a distance equal to the distance between centres of successive images on the film, but without the prejudicial effect upon the perforations in the edges of the film, which results when the feed is directly effected by the engagement of the perforations by toothed feed sprockets.

In Figures 3 to 5 of the accompanying diagrammatic drawings is represented, by way of example, a practical construction of the feed mechanism.

Figure 3 is a side elevation; Figure 4 is a section on the line 3—3 of Figure 3, Figure 5 is a cross-section on the line 5—5 of Figure 3 and Figure 6 is a sectional elevation on the line 6—6 of Figure 5.

The film 1 passes first between two guide rollers 2 and 3, the roller 2 having projecting edges or flanges provided upon their periphery with a projection 4, which, when it engages the roller 3 causes the said roller to be slightly separated from the roller 2 so that the engagement of the film 1 between the two rollers ceases intermittently each time that the said film is to be fed forward past the projection window, and for this purpose the spindle 8 of the roller 3 may be pivotally suspended from the spindle 9.

The film then passes between the member 30, which serves as guide and in which is provided the projection window, and the frame or gate 31 which is provided with a corresponding opening coincident with the projection window. The film passes then between the gripping members 5 and 6, of which the member 6 is pivoted at 7 to a guide member 28 in which the member 5 is slidably mounted. The member 6 is maintained in position against the guide member 28 by means of a spring catch 10.

The guide member 28 with the gripping member 6 are mounted upon an arm 11 which is provided at the forward end with extensions 11' above and below to which extensions the guide member 28 is secured. The arm 11 is pivoted upon the spindle 12, and is oscillated by means of a cam or eccentric 13 mounted upon a spindle 33 carried rotatably in the fixed frame of the apparatus, which cam or eccentric operates in a containing casing 14 on the arm 11 which casing is shown broken in Figure 3 and in section in Figure 4; a tension spring 15 serves to cause the arm 11 to follow the cam 13.

An eccentric 16 also mounted upon the spindle 33 operates a rod 17, which traverses a boss 18 against which one of the extremities of each of the compression springs 19 and 20 is applied, the other of the respective ends being applied against the nuts 21 and 22 which are screwed upon the rod 17.

The boss 18 projects through a slot 23 provided in the arm 11 whereby it is capable of movement longitudinally along the arm, and is connected to a rod or slide 24 having an extension 25 to which the gripping member 5 is secured.

In the drawings the parts are shown in the position in which the member 5, and the blocks 29 of the member 6 are gripping the film and the arm 11 has effected half its downward movement. The movement of the eccentric 16 is resiliently communicated to the slide 24 through the springs 19 and 20 bearing against opposite sides of the boss 18 fixed to the slide 24. The actual movement of the slide 24 is determined in one direction by the engagement of the member 5 against the member 6 with the interposition of the film, and in the other direction may be determined by the counter acting pressures of the two springs 19 and 22. Thus, each time that the eccentric 16 effects the movement of the rod 17 from the left to the right, the spring 19 is compressed between the nut 21 and the boss 18, and the spring 20 opens out between the boss 18 and the nut 22, the said boss causing the rod or slide 24 to be moved from the left to the right, and consequently causing the gripping member 5 to be separated from the other gripping member 6, whereby the film 1 which passes between the two gripping members 5, 6 is released. When the eccentric 16 causes the movement of the rod 17 from the right to the left, the operations are reversed, and the gripping member 5 is moved towards the gripping member 6 to engage the film between them.

The period when the film 1 is released by the gripping members 5, 6 coincides with the upward movement of the arm 11, and the period when the film 1 is gripped between the gripping members 5, 6 coincides with the downward movement of the arm 11. Thus an intermittent feed of the film is effected for the purpose of producing the successive changes of images and to secure cinematographic effects.

The first part of the film drawn forward by the members 5, 6 is moved in part by the toothed sprockets 27 which receive an intermittent movement from a Maltese cross mechanism (not represented in the drawing) of known kind, and these sprockets 27 guide and withdraw the film 1 each time to an extent exactly corresponding to the distance between centres of successive images on the film, and as the members 5, 6 have drawn the film forward to a greater extent than the sprockets 27, there remains formed at 1' a loop or fold equivalent to the excess length of film.

It is necessary that this loop or fold of the excess length of film should be transferred to a position above the members 5, 6 between the latter and the projection window 30. This is attained by providing upon the member 6 two blocks 29 slidably carried therein and pressed forward by a spring 26 secured to a boss upon the member 6 by a screw 26' to follow the movements of the member 5 and to effect permanent engagement of the film with a pressure just sufficient to permit the film to be drawn upwardly, when the arm 11 rises, and the gripping member 5 is withdrawn by the action of the cam 16, until the loop or fold in the film below the members 5, 6 has been extended. The pressure exerted by the spring 26 is such that as soon as the slackness represented by the loop or fold 1' is taken up, the resistance of the film itself then causes the film to slide between the blocks 29 and the member 5, since the spring 26 is not sufficiently strong to overcome the said resistance. In this manner the loop or fold 1' in the film is transferred to a position above the members 5, 6 as indicated in Figure 2, and the succeeding feed of the film past the projection window will not be effected by the members 5 and 6 when the arm 11 descends until the film is extended so that thus, the succeeding feed movement will cause the advance of the film only to an extent equivalent to the travel of the members 5, 6 less the length of the loop or fold 1'. By such means the extent to which the film is fed past the projection window at each feed movement is determined by the toothed sprockets 27, while the actual feed of the film is effected by the members 5, 6 upon the arm 11.

As previously stated, the construction described is given by way of example only, since the method of effecting the feed can be embodied in various constructions without departing from the invention.

I claim:

1. In cinematographic apparatus, mechanism for obtaining the intermittent feed of the film, comprising a positive feed device, means adapted to operate said positive feed device intermittently to feed the film to an extent corresponding to the distance between the centres of successive images on the film, film gripping elements, a member disposed above said positive feed device and carrying said film gripping elements, means adapted to reciprocate said member so that said film gripping elements rise and fall to an extent greater than the distance between the centres of successive images on the film, means adapted to operate said film gripping elements to grip the film on movement of the member carrying the said elements in the direction of feed of the film towards the positive feed device so as to form a slack part of the film between said film gripping elements and said positive feed device, and to release the film on movement of the said member carrying the said elements in the reverse direction, and means upon said film gripping elements adapted to engage the film by friction so as to transfer the slack part of the film to a position above said film gripping elements on movement of the member carrying the said elements in the reverse direction, substantially as described.

2. In cinematographic apparatus, mechanism for obtaining the intermittent feed of the film, comprising film gripping elements, a pivoted arm disposed above said positive feed device and carrying said film gripping elements, means adapted to reciprocate said pivoted arm so that said film gripping elements rise and fall to an extent greater than the distance between centres of successive images on the film, means adapted to operate said film gripping elements to grip the film on movement of a pivoted arm in the direction of feed of the film towards the positive feed device, so as to form a slack part of the film between the said film gripping elements and said positive feed device and to release the film on movement of the said pivoted arm in the reverse direction, and means upon said film gripping elements adapted to engage the film by friction so as to transfer the slack part of the film to a position above said film gripping elements on movement of the pivoted arm in the reverse direction, substantially as described.

3. In cinematographic apparatus, mechanism for obtaining the intermittent feed of the film, comprising film gripping elements, a pivoted arm disposed above said positive feed device and carrying said film gripping elements, a rotary element adapted to reciprocate said pivoted arm so that said film gripping elements rise and fall to an extent greater than the distance between centres of successive images on the film, means adapted to operate said film gripping elements to grip the film on movement of a pivoted arm in the direction of feed of the film towards the positive feed device, so as to form a slack part of the film between the said film gripping elements and said positive feed device and to release the film on movement of the said pivoted arm in the reverse direction, and means upon said film gripping elements adapted to engage the film by friction so as to transfer the slack part of the film to a position above said film gripping elements on movement of the pivoted arm in the reverse direction, substantially as described.

4. In cinematographic apparatus, mechanism for intermittently feeding the film, comprising film gripping elements, a pivoted arm carrying said film gripping elements, a cam operatively connected to said pivoted arm for effecting its reciprocation, a slide carried by said pivoted arm and to which one of said film gripping elements is connected, an eccentric connected to said slide for its reciprocation upon one of the film gripping elements, means upon said pivoted arm adapted permanently to engage the film by friction, a positive feed device situated in advance of said film gripping elements, and means for operating said positive feed device intermittently to feed the film to an extent corresponding to the distance between the centres of successive images on the film, substantially as described.

5. In cinematographic apparatus, mechanism for intermittently feeding the film, comprising film gripping elements, a pivoted arm upon which one of the film gripping elements is mounted in fixed position, a slide carried by said pivoted arm and upon which the other of said film gripping elements is mounted, means upon one of said film gripping elements adapted permanently to engage the film by friction with the other of the said film gripping elements, a cam operatively connected to said pivoted arm for effecting its reciprocation, an eccentric connected to said slide for its reciprocation upon said pivoted arm, a positive feed device situated in advance of said film gripping elements, and means adapted to operate said positive feed device intermittently to feed the film to an extent corresponding to the distance between the centres of successive images on the film, substantially as described.

6. In cinematographic apparatus, mechanism for intermittently feeding the film comprising film gripping elements, a pivoted arm upon which one of the film gripping elements is mounted in fixed position, a slide carried by said pivoted arm and upon which the other of said film gripping elements is mounted, means upon one of said film gripping elements adapted permanently to engage the film by friction with the other of the said film gripping elements, a cam operatively connected to said pivoted arm for effecting its reciprocation, an eccentric connected to said slide for its reciprocation upon said pivoted arm, toothed sprockets situated in advance of said film gripping elements, and means adapted to operate said toothed sprockets intermittently to feed the film to an extent corresponding to the distance between centres of successive images on the film, substantially as described.

JUAN SASTRE POCOVÍ.